United States Patent [19]
Richie

[11] 3,892,145
[45] July 1, 1975

[54] CABLE END STRIPPING DEVICE

[75] Inventor: Edward H. Richie, Downers Grove, Ill.

[73] Assignee: Industrial Development & Experimental Associates, Inc., Villa Park, Ill.

[22] Filed: July 11, 1974

[21] Appl. No.: 487,549

[52] U.S. Cl. .............................................. 81/9.51
[51] Int. Cl. ............................................. H02g 1/12
[58] Field of Search ........................... 81/9.51, 9.5 A

[56] References Cited
UNITED STATES PATENTS

| | | | |
|---|---|---|---|
| 2,880,635 | 4/1959 | Harris ................................. | 81/9.51 |
| 3,636,799 | 1/1972 | Weitala et al. ...................... | 81/9.51 |
| 3,748,932 | 7/1973 | Neiman et al. ..................... | 81/9.51 |

*Primary Examiner*—Donald G. Kelly
*Assistant Examiner*—Roscoe V. Parker
*Attorney, Agent, or Firm*—Mann, Brown, McWilliams & Bradway

[57] ABSTRACT

An electrical cable end stripping device comprising a pivotally mounted hub having a central aperture through which the cable end is extended to a stripping position beyond the hub, and which hub pivotally mounts a plurality of swing levers each having a rotary cutter blade journaled on one end of same for coplanar application to the cable jacket and having their other ends pivotally connected to an actuator journaled on the hub for swinging the cutting blades between cutting and inoperative positions relative to the cable jacket, and having the blades circumferentially of the jacket to cut same circumferentially when in cutting relation to the jacket. Each cutting blade has associated with same a cable jacket engaging stop that limits penetration of the blades into the cable. The cable end that is positioned relative to the hub for stripping is engaged by gripping jaws, mounted on a shiftable member, to grip the jacket, and by moving the shiftable member with the jaws in place against the jacket, longitudinally of the cable, the severed jacket end is stripped off the cable.

7 Claims, 8 Drawing Figures

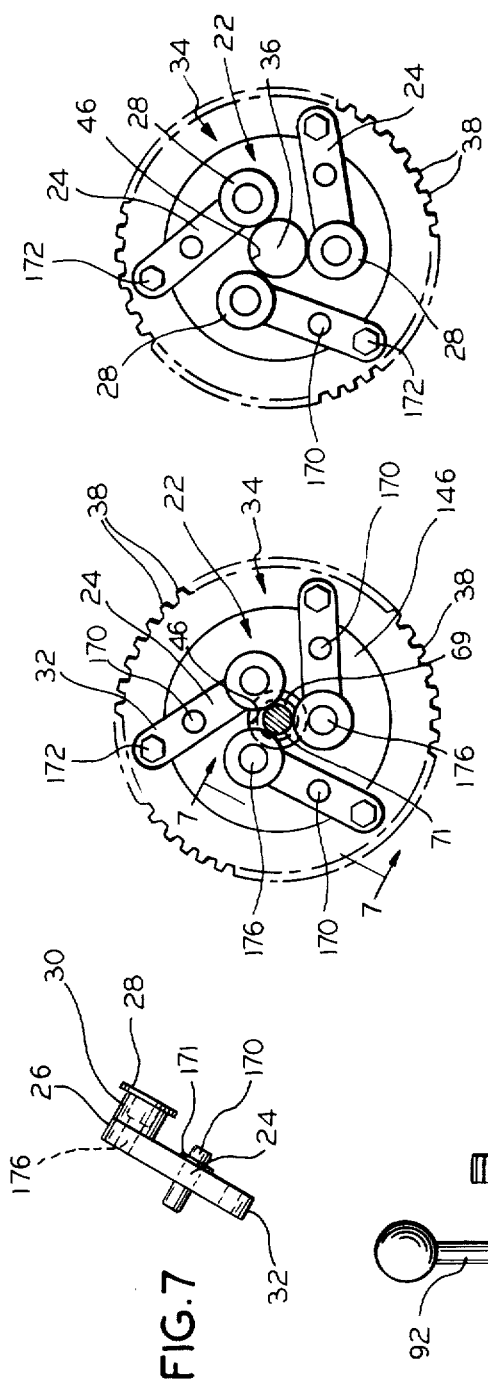
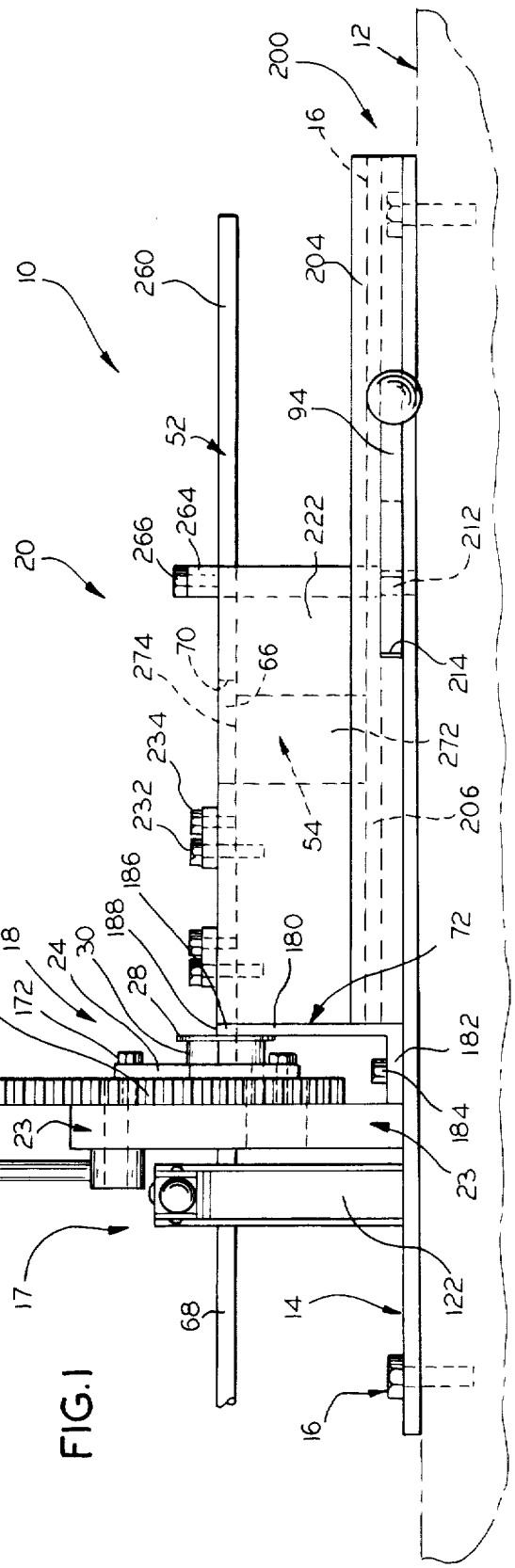

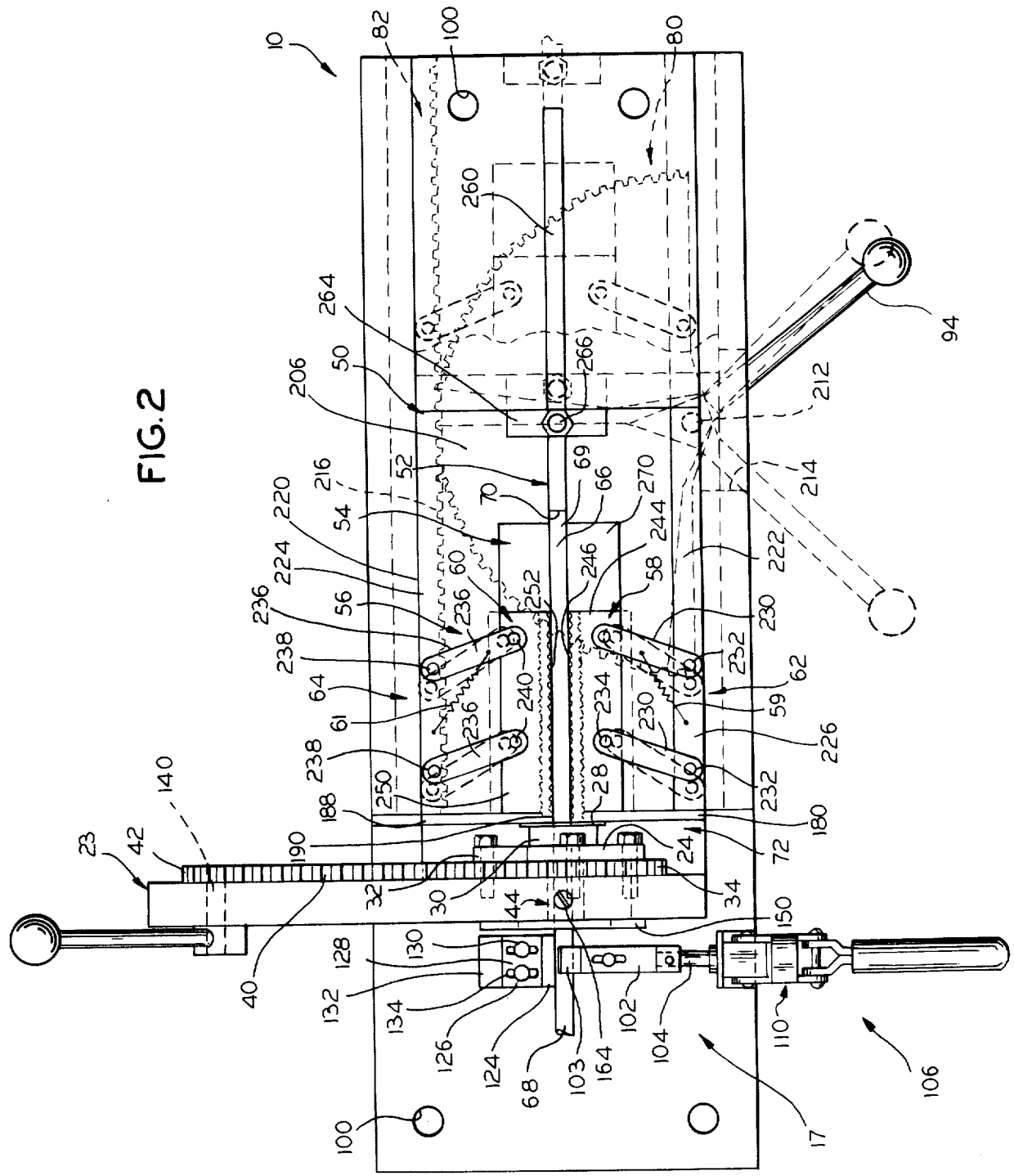

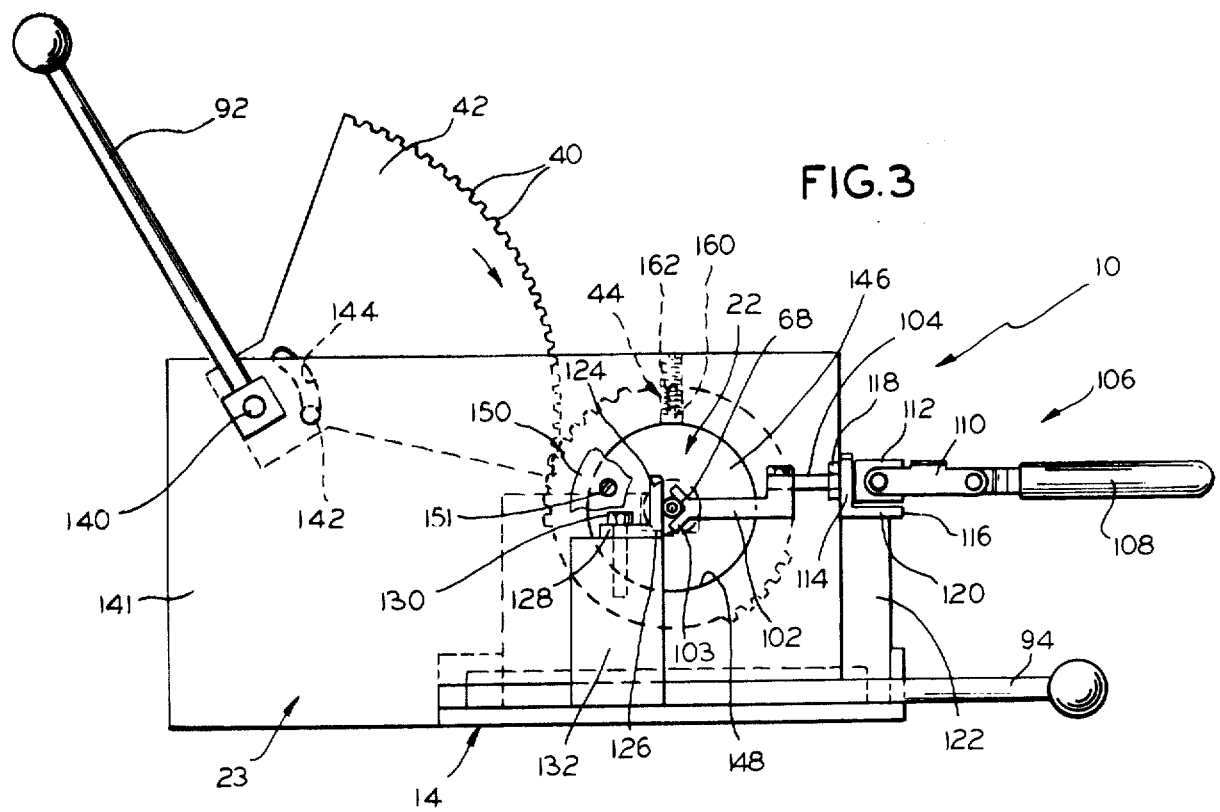
FIG. 3
FIG. 3A
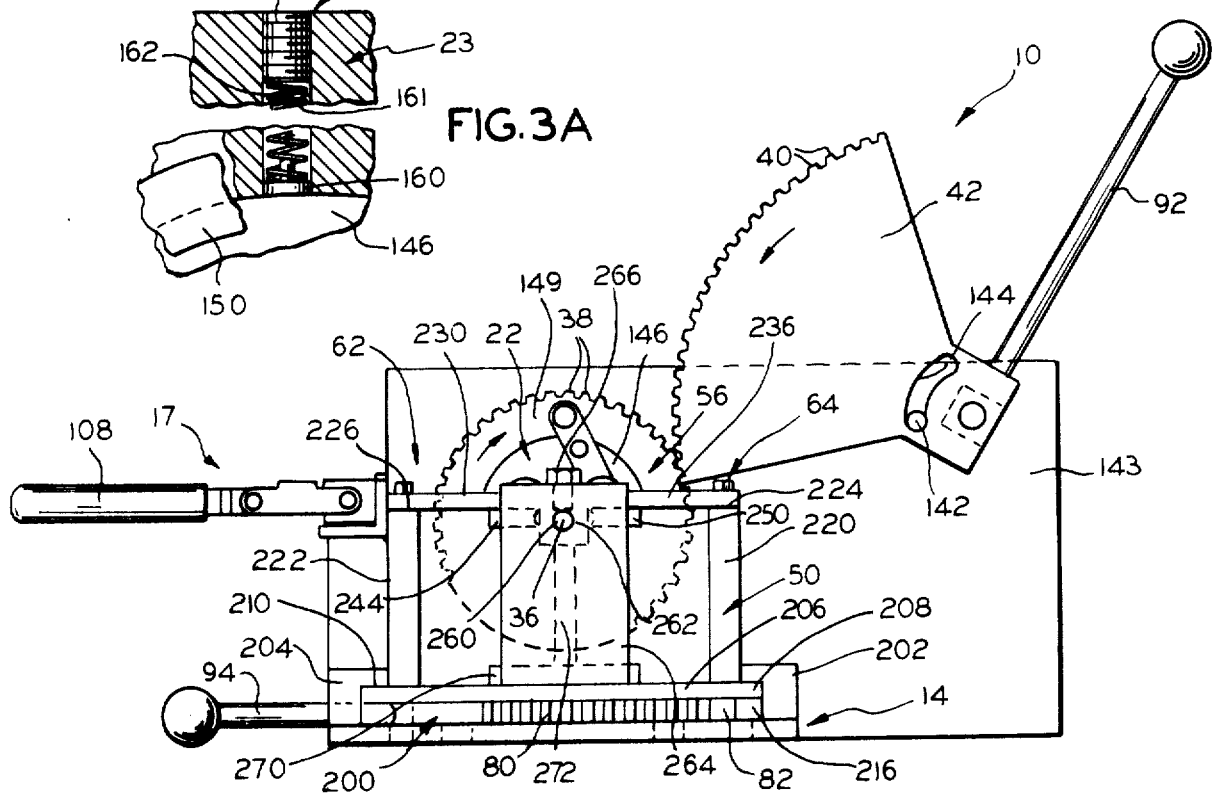
FIG. 4

CABLE END STRIPPING DEVICE

This invention relates to a cable end stripping device, and more particularly, to a device for mechanically cutting and stripping the jacket off the ends of electrical cable.

Stripping of electrical cable ends, to prepare them for making electrical connections, as a matter of general practice, has generally speaking a hand operation using a knife, for lack in the industry of a practical and effective mechanical stripper.

While prior art devices have been proposed for this purpose, they have been generally considered impractical or ineffective due to the inability to reliably cut the jacket without damaging the cable wires or their insulation (where present), and effectively grip the jacket for stripping from the cable end, again without damaging the cable wires.

Consequently the time consuming hand processing of cable ends has continued in general use in spite of the frequency of damaged cables that results and the hand injuries and entire nature of the work that are involved for this type of task.

A principal object of this invention is to provide a cable end stripper that provides mechanical stripping of the cable end, but which is adapted for both hand operation or automatic operation.

Another principal object of the invention is to provide a mechanical cable end stripping device that cuts the cable jacket cleanly and provides for ready removal of the jacket without risking cable damage.

Other objects of the invention are to provide a mechanical cable end stripper that is readily operated by unskilled labor, that accommodates varying cable sizes within reasonable limits, and that is economical of manufacture, convenient to install and use, and long lived in operation.

In accordance with this invention, a mechanical cable end stripping device is provided comprising a hub pivotally mounted on a base having a central aperture through which the cable end is extended to a stripping position, which hub pivotally mounts a plurality of swing levers each having a rotary cutter blade journaled at one end of same for coplanar application to the cable jacket and having their other ends pivotally connected to an actuator journled on the hub for swinging the cutting blades between cutting and operating positions. Each cutting blade has associated with same a cable jacket engaging stop that limits penetration of the blades into the jacket, and pivotal movement of the actuator relative to the hub induces similar pivotal movement of the hub for movement of the cutting blades about the cable jacket to complete circumferential cutting of the jacket to the desired depth. Pivotal movement of the hub is braked to provide the differential movement between the actuator and the hub to swing the cutting blade bearing levers.

Operably associated with the hub is a slide member mounting a pair of gripping jaws that comprise a pair of elongate gripping jaw elements that are parallel linkage mounted on the shiftable member and are spring biased to close on the cable end when inserted between them. The jaw elements cooperate with a stop interposed between the slide member and the hub such that when the shiftable member is disposed adjacent the hub the jaws are opened to receive the cable end, but when shifted from the stop they close on the cable end, and on movement of the shiftable member, the cable jacket, after it has been severed by the cutting blades, is stripped from the cable end.

The shiftable member carries an adjustable stop device for setting the cable end at the desired stripping length.

Other objects, uses and advantages will become obvious or be apparent from a consideration of the following detailed description and the application drawings.

In the drawings:

FIG. 1 is a side elevational view illustrating one embodiment of the invention as it might be applied to a workbench or the like;

FIG. 2 is a plan view of the device shown in FIG. 1;

FIG. 3 is an end view of the device taken from the left hand side of FIG. 1;

FIG. 3A is a fragmental view illustrating a detail of construction;

FIG. 4 is an end view of the device taken from the right hand side of FIG. 1;

FIG. 5 is a diagrammatic view of the cutting assembly of the device, showing the cutting blades in cutting relation to a cable end;

FIG. 6 is a view similar to that of FIG. 5 but illustrating the cutting blades spread apart for application of a cable end to the device; and FIG. 7 is a fragmental view of one of the cutting blades and associated operating lever, taken substantially along line 7—7 of FIG. 5.

However, it is to be understood that the specific drawing illustrations provided are supplied primarily to comply with the requirements of the Patent Laws, and that the invention is susceptible of other embodiments that will be obvious to those skilled in the art, and which are intended to be covered by the appended claims.

GENERAL DESCRIPTION

Reference numeral 10 of FIGS. 1–4 generally indicates one embodiment of the invention applied in operative relation to a suitable workbench 12, or the like, the latter being shown only diagrammatically. The device 10 comprises a base plate 14 suitably secured in place by a suitable fasteners, such as bolts 16 and operatively mounting cable clamp device 17, a cable jacket cutting assembly 18, and a cable stripping assembly 20.

The cable jacket cutting assembly 18 generally comprises a hub 22 journaled in a mounting place 23 that is suitably affixed to the base plate 14, as by welding or the like. The hub 22 has pivotally connected to same a plurality of levers 24 each carrying at one end 26 of same a rotary cutter blade 28 and a cable jacket engaging hub or sleeve 30 that limits the depth of cut of the respective blades 28.

The other ends 32 of the levers 24 are pivotally connected to an actuator 34 that is also journaled on the mounting plate 23 for pivotal movement about the axis 36 of hub 22, and is provided with gear teeth 38 meshing with gear teeth 40 of hand operated gear segment 42 for this purpose. A suitable brake device 44 brakes the movement of hub 22 relative to actuator 34 whereby the relative differences in pivotal movement between the hub and the actuator, on movement of the actuator, move the levers 24 and their cutting blades 28 between the relative positions shown in FIGS. 5 and 6, with respect to a central cable receiving opening 46 formed in the hub 22 in coaxial relation with its axis 36.

3

The cable stripping assembly 20 generally comprises a slide member 50 operably mounting an adjustable stop 52, a cable end support 54, and a pair 56 of gripping jaws 58 and 60 in coplanar relation and mounted by the respective parallel linkages 62 and 64 to support the jaws 58 and 60 for operative relation with the end 66 of the cable 68 that is to be stripped of its jacket 69 at its end 66 to expose the cable wires 71. The jaws 60 and 56 are spring biased, as by suitable springs 59 and 61, for movement into engagement with the cable end 66 when the latter is inserted in between same, on being inserted through the opening 46 of hub 22, and brought up against the terminal end 70 of the adjustable stop 52, for purposes of applying the cable 68 to the device 10 for stripping purposes. The position of the stop 52 may be adjusted to adjust the length of the cable end that is to be stripped.

Mounted between the cutting blades 28 and the slide member 50 is a fixed stop member 72 against which the jaws 58 and 60 are moved for the purposes of opening them, to receive the cable ends 66, against their spring bias.

The slide member 50 is moved relative to the base plate 14 by hand operated gear segment 80 meshing with rack 82 that is a fixed part of the slide member 50.

The device 10 includes the cable clamp device 17, which may be of any suitable type, for fixing the cable being stripped against longitudinal and lateral movement. In the hand operated form of the invention that is illustrated, gear segment 42 is provided with a suitable operating handle 92 and gear segment 80 is provided with a suitable operating handle 94.

The device 10 is employed by inserting the cable end 66 through the hub central opening 46 and drawing it up to the end 70 of the adjustable stop 52, with the handle 94 being positioned to draw jaws 58 and 60 against fixed stop 72 to separate them against the action of their biasing springs 59 and 61. Handle 94 is moved to the right hand dashed line position for this purpose.

The insertion of the cable end 66 through the hub opening 46 requires, of course, that the gear segment 42 be in the position of FIGS. 3 and 4 so that the cutting blades 28 are positioned as shown in FIG. 6 for easy insertion of the cable through the hub.

After operating the clamp device 17 to clamp the cable in place, movement of the gear segment 42, by employing its handle 92, clockwise of FIG. 3 rotates the actuator member 34, through its gear teeth 38 in a counterclockwise direction (in the showing of FIG. 3) relative to the brake drag on hub 22 to swing the levers from their positions of FIG. 6 to their position of FIG. 5 to bring them into cutting relation with the jacket 69 of cable 68 with the hub 22 then pivoting about its axis 36 under continued movement of actuator 34 in the same direction, so that the cutting blades 28 move circumferentially about the cable to sever the cable jacket 69 about its circumference. Preferably the cutting blades are proportioned relative to the hubs 30 so that the cutting blades do not entirely sever the jacket, but leave a jacket thickness on the order of 0.005 inch to avoid cutting into the individual wires of the cable and in particular, any insulation that may be on same.

When the gear segment 42 is pivoted clockwise of FIG. 3 sufficiently to circumferentially cut the jacket 69, it is returned to the position of FIGS. 3 and 4 to return the cutter blades 28 to the position of FIG. 6.

The gear segment 80 is then moved, by using handle 94, to shift the slide member 50 to the right of FIG. 2, and approximately to the left hand dashed line position shown in FIG. 2, to complete the severing of the jacket end and effect stripping of the jacket end from the cable.

The slide member is returned to the left with the handle 94 being moved to the right hand dashed position to open the jaws 58 and 60 for ready removal of the stripped cable end and insertion of another cable end 66 for treatment in a like manner.

SPECIFIC DESCRIPTION

Base plate 14 is generally rectangular in configuration and may be formed of any suitable material, such a sheet steel, that permits application thereto of the operating components referred to as well as the base plate itself to a support table 12 or the like. Base plate 14 in the form shown is formed with four bolt holes 100 to receive the respective bolts 16.

The clamp device for holding the cable during operation of the device 10 may be of any suitable type, the clamp device 17 illustrated being in the form of a clamp member 102 (see FIGS. 2 and 3) having a cable engaging jaw 103 and suitable mounted on the shank 104 of toggle type actuator 106 having suitable handle 108 operatively connected to the shank 104 by suitable means, such as the familiar toggle linkage 110 (which is only diagrammatically illustrated). The toggle linkage 110 in the form shown is pivotally connected to a fitting 112 having a neck (not shown) passing through the arm 114 of angle member 116 and secured thereto by suitable nut 118. The other arm 120 of angle member 116 is fixed to a suitable mounting bar 122 that is in turn suitably affixed to base plate 14.

The clamping member 102, specifically jaw 103, clamps the cable 68 between the flange 124 of angle member 126 that has its other flange 128 secured by suitable bolts 130 to mounting bar 132 that is suitably affixed to the base plate 14. As indicated in FIG. 2, the flange 128 of the angle member 126 is formed with the elongate openings 134 through which the bolts 130 pass to permit lateral adjustment of the angle member 126 for accommodating different size cables.

The mounting plate 23 in which the hub 22 is journaled extends crosswise of the base plate 14 and is affixed thereto in any suitable manner, as by welding. In the form shown, the mounting plate 23 journals a spindle 140 having handle 92 suitably keyed to one end thereof, on one side 141 of the mounting plate 23, and gear segment 42 suitably keyed to the other end thereof on the other side 143 of the mounting plate 23. Mounting plate 23, at its side 143 also has fixed to same stop pin 142 operating in arcuate slot 144 formed in the gear segment 42 to limit the path of pivotal movement of the gear segment 42, but yet provide sufficient movement so that the cutting blades 28 are moved between the positions of FIGS. 5 and 6 and sufficiently circumferentially of the cable to insure a clean cut in the cable jacket 360° about the circumference of the cable jacket. In the form shown, three cutter blades 28, which are in coplanar relation (see FIG. 2), are employed in equally spaced relation and consequently slot 144 should be of sufficient length so that hub 22 will rotate somewhat in excess of 120°.

The hub 22 comprises disc member 146 suitably journaled in opening 148 (see FIG. 3) formed in the mounting plate 23 that has a diameter substantially complementing that of disc 146 for close fitting relation therebetween to appropriately journal the disc 146 within the mounting plate 23. The actuator 34 is in the form of a gear plate 149, forward with the gear teeth 38 and journaled on the disc 146, with the gear teeth 38 being in meshing relation with the gear teeth 40 of gear segment 42. Suitably secured to the other side of the disc 146, as by employing screws 151, is retainer ring 150 that removably mounts the hub 22 in its operating position. The retainer member 150 is shown fragmentally in FIG. 3, and freely passes the maximum size cable to be processed by the device 10.

The brake device 44 (see FIG. 3A) may be of any suitable type, that shown generally comprising a suitable brake shoe 160 received in bore 161 of mounting plate 23 and spring biased against the periphery of disc 146 by suitable compression spring 162 held in place by the cap 164 that is threadedly mounted in the bore of the mounting plate. As indicated, the brake device 44 sufficiently brakes the pivotal movement of the hub 22 relative to gear 34 so that the levers 24 of the cutting blades 28 have the swinging action illustrated in FIGS. 5 and 6, in addition to their circumferential movement about the cable.

The levers 24 are pivotally mounted on the disc 146 by suitable pins 170 anchored in disc 146 and equipped with lock rings 171 to hold levers 24 against disc 146. Suitable bolts 172 pivotally connect the respective levers 24 to the gear 34.

In the form shown, the cutter blades 28 are fixed to their hubs 30, which are rotatably mounted on the respective lever ends 26 by suitable pins 176.

The stop member 72 comprises angle member 180 extending transversely of the base plate 14 and having its lower flange 182 affixed thereto by suitable bolts 184, and its upright flange 186 serving as the stop to open the jaws 58 and 60 when the handle is moved to the extreme right dashed line position of FIG. 2. The upper edge 188 of the angle member 180 is notched as at 190 (see FIG. 2) to receive the cable 68.

The slide member 50 is slidably mounted in slideway 200 defined by the opposed angle members 202 and 204 that are suitably secured to the base plate 14, as by welding. Slide member 50 comprises a base plate 206 having its opposed side edges 208 and 210 in guided relation with the members 202 and 204, and plate 206, in the form shown, rides on top of gear segment 80 which operates in the slideway 200. Gear segment 80 is pivotally connected to the base plate 14 by suitable pin 212 and the handle 94 of the gear segment 80 projects sideways of the slideway 80 through a window opening 214 formed in the guide member 204. Gear segment 80 meshes with gear rack 216 fixed to the underside of the base plate 206 along its edge 208.

Slide member 80 further includes the spaced apart side walls 220 and 222 on the respective upper edges 224 and 226 of which are mounted a respective parallel linkages 64 and 62. The parallel linkage 62 comprises a pair of swing arms 230 pivotally mounted on the side plate 222 by appropriate pins or screws 232 and pivotally connected to the jaw 58 by appropriate pins or screws 234. Parallel linkage 64 comprises a similar pair of swing arms 236 pivotally mounted on the side wall 220 by appropriate pins or screws 238 and pivotally connected to the jaw 60 by appropriate pins or screws 240.

The jaw 58 comprises elongate plate element 244 defining an elongate cable gripping surface 246 that is preferably serrated in nature. Similarly, jaw 60 comprises jaw element 250 formed with elongate gripping surface 252 that is likewise serrated.

In the form shown, the biasing means that biases the jaws to closed position is illustrated by the suitable tension springs 59 and 61 that are suitably connected between one of the swing levers of each jaw and the slider member side plate to which the respective swing arms are connected, as indicated in FIG. 2.

The stop 52 comprises a rod 260 received in opening 262 of a support bar 264 that is suitably affixed to the slider member base plate 206 in upright position, as by welding. The opening 262 substantially complements the external diameter of the rod 260, for close fitting cooperation that accommodates free movement of the rod 260 relative thereto, with the rod 260 being fixed in adjusted position by securement screw or bolt 266. As indicated in FIG. 4, the rod 260 is aligned with the level of the cable end relative to the base plate 14, and is aligned with axis 36.

The support 54 for the cable end 66 comprises a base member 270 fixed to the slider member base plate 206 and having mounted on same an upright member 272 that has its upper edge 274 positioned to support the cable end 66 in alignment with the end 70 of the stop 52.

The device 10 is arranged to strip from zero up to 12 inches of jacket off the cable end (depending on the position of stop 52), and accommodate cable sizes ranging from one-quarter to three-quarters of an inch in outer diameter (of the jacket).

Obviously the operation of the gear segments 42 and 80 may be effected by automatic machine operation in any suitable manner to arrange the device 10 for full automatic machine operation.

It will be apparent that the device herein disclosed avoids the difficulties of prior art stripping devices, while at the same time permitting a mechanical stripping action that will strip the cable in 15 to 20 seconds.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A device for stripping the ends of electrical cable, said device comprising:
    a hub defining a central axis and having a central aperture extedning therethrough aligned with said axis through which the cable end may be extended from one side of said hub to the stripping position of same,
    means for clamping the cable end against movement laterally and longitudinally thereof,
    a plurality of swing levers pivotally mounted on said hub,
    said levers each carrying a cutting blade at one side of same,
    an actuator mounted for pivotal movement about said axis relative to said hub,
    said levers each being pivotally connected to said actuator with said cutting blades disposed for swinging movement toward and away from said axis on pivotal movement of said actuator member about said axis between positions in cutting relation with the jacket for cutting the jacket and positions disposed to be free of the cable jacket when disposed in said aperture, means for moving said actuator about said axis of said hub to move said blades between said positions, a slide structure positioned on the other side of said hub, said slide structure comprising:

a slide member mounted for movement toward and away from said hub in substantial parallelism to said axis, said member carrying a stop aligned with said axis against which the cable end may be disposed relative to the hub to define the stripping position of the cable end, said member mounting a pair of opposed clamping jaws disposed on either side of said axis, between said stop and said hub, for gripping the jacket of a cable end extended through said hub to said stop, and means for moving said slide member away from said hub when the jacket has been severed by said blades for stripping the severed jacket end from the cable end.

2. A device for stripping the ends of electrical cable, said device comprising:

a base, a hub mounted on said base, said hub having a central axis and a central aperture extending therethrough aligned with said axis through which the cable end may be extended from one side of said hub to the stripping position of same, means for clamping the cable end against movement laterally and longitudinally thereof relative to said base, said hub being mounted for pivotal movement about said axis, a plurality of swing levers pivotally mounted on said hub in spaced apart relation about said axis, said levers each carrying a cutting blade at one end of same, said cutting blades being in coplanar relation transversely of said axis, an actuator mounted for pivotal movement about said axis relative to said hub, said levers each being pivotally connected to said actuator with said cutting blades disposed for swinging movement toward and away from said axis on pivotal movement of said actuator member about said axis between positions in cutting relation with the jacket for cutting the jacket and positions disposed to be free of the cable jacket, when the cable is disposed in said aperture, in its stripping position, means for moving said actuator about said axis of said hub to move said blades between said positions and pivot said hub about said axis to move said cutting blades about the circumference of the cable jacket in cutting relation therewith for circumferential cutting of the jacket, said slide structure comprising:

a slide member mounted on said base for movement toward and away from said hub in substantial parallelism to said axis, said member carrying a stop aligned with said axis against which the cable end may be disposed relative to the hub to define the stripping position of the cable end, said slide member mounting a pair of opposed clamping jaws disposed on either side of said axis, between said stop and said hub, for gripping the cable jacket of a cable end extended through said hub to said stop, and means for moving said slide member away from said hub when the jacket has been circumferentially cut by said blades for stripping the severed jacket end from the cable end.

3. The device set forth in claim 2 wherein:

said jaws each comprise:

a jaw element that is formed with an elongate gripping surface for engagement with an elongate portion of the cable jacket, and a parallel linkage for each jaw element for movement toward and away from each other, said linkages being angled at similar but opposite angles relative to said axis and being inclined in the direction of jacket stripping movement of said slide member, stop means interposed between said hub and jaws and fixed relative to said base, and means for biasing said jaws to their closed positions, said jaw elements being positioned to engage said stop means when said slide member is adjacent said hub to open said jaws against the action of said biasing means to receive the cable end for passing the latter between said hub and said stop.

4. The device set forth in claim 3 wherein:

said slide member includes a support member between said stop and said jaws on which the cable end may rest.

5. The device set forth in claim 2 wherein:

said cutting blades are circular in configuration, said blades each being journaled on the respective levers carrying same, and means for limiting the penetration of said blades into the cable to substantially the thickness of the cable jacket.

6. The device set forth in claim 2 wherein:

said means for clamping the cable comprises a toggle type clamping unit mounted on the base on said one side of said hub.

7. The device set forth in claim 2 wherein:

said stop is mounted for adjusting movement relative to said slide member longitudinally of said axis.

* * * * *